UNITED STATES PATENT OFFICE.

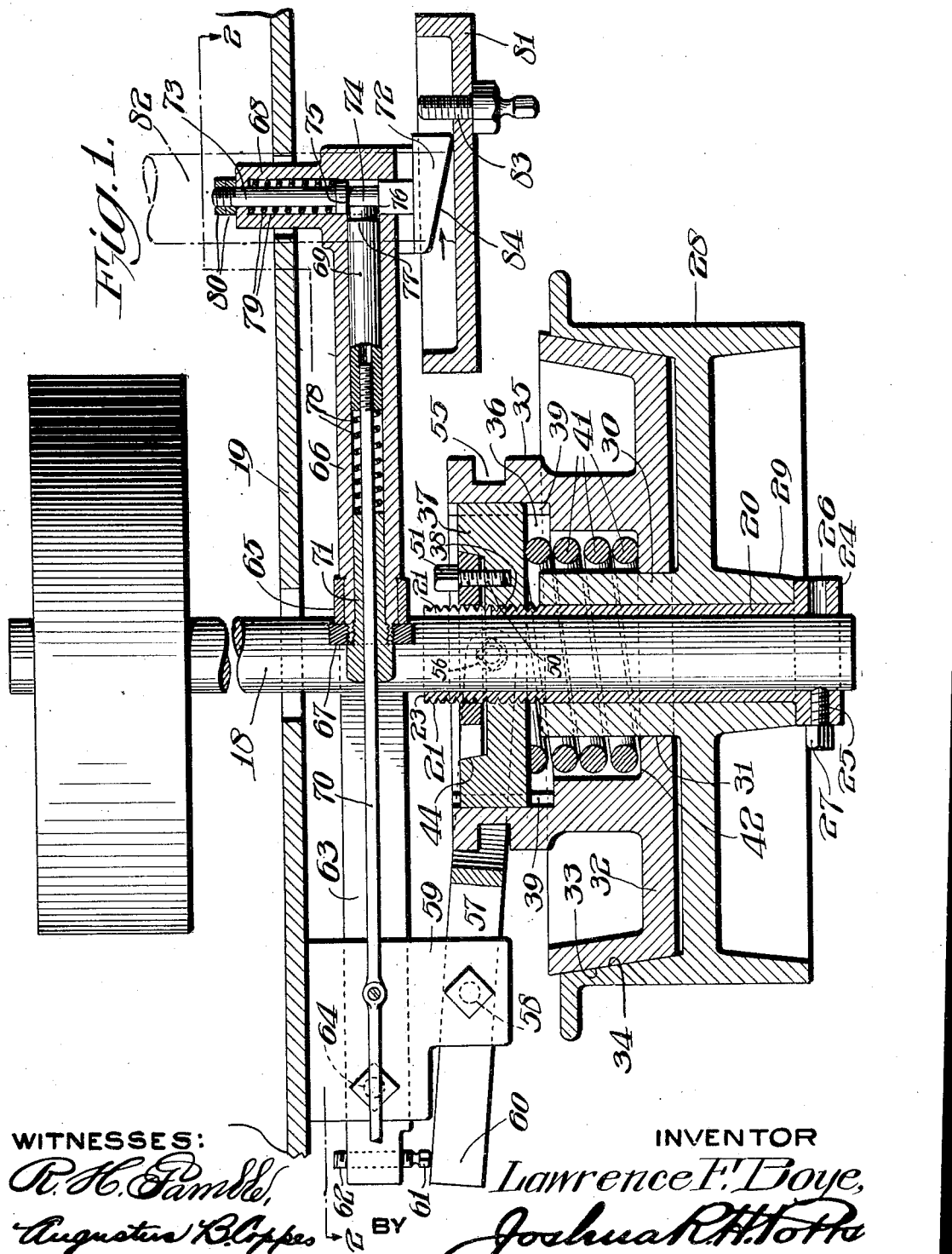

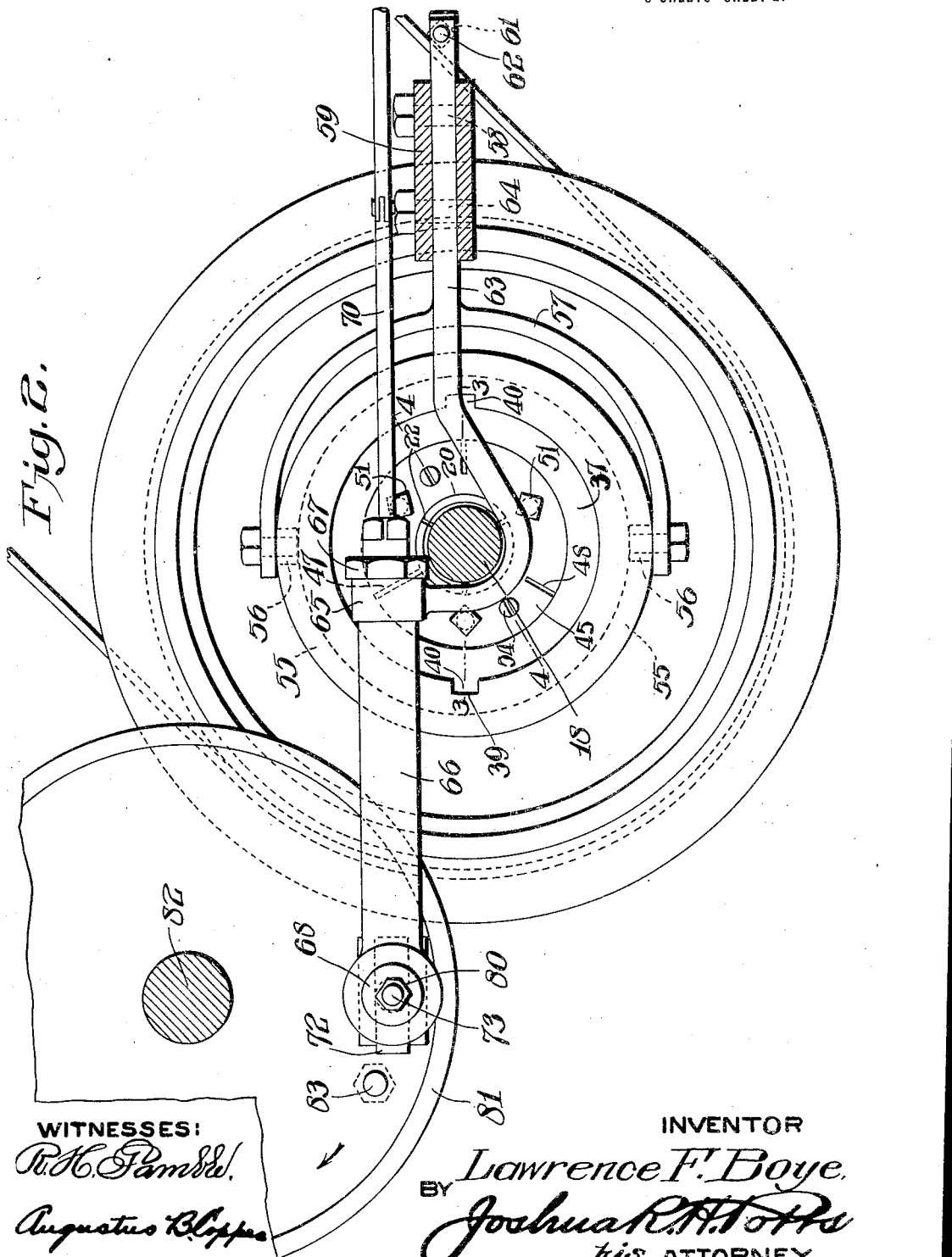

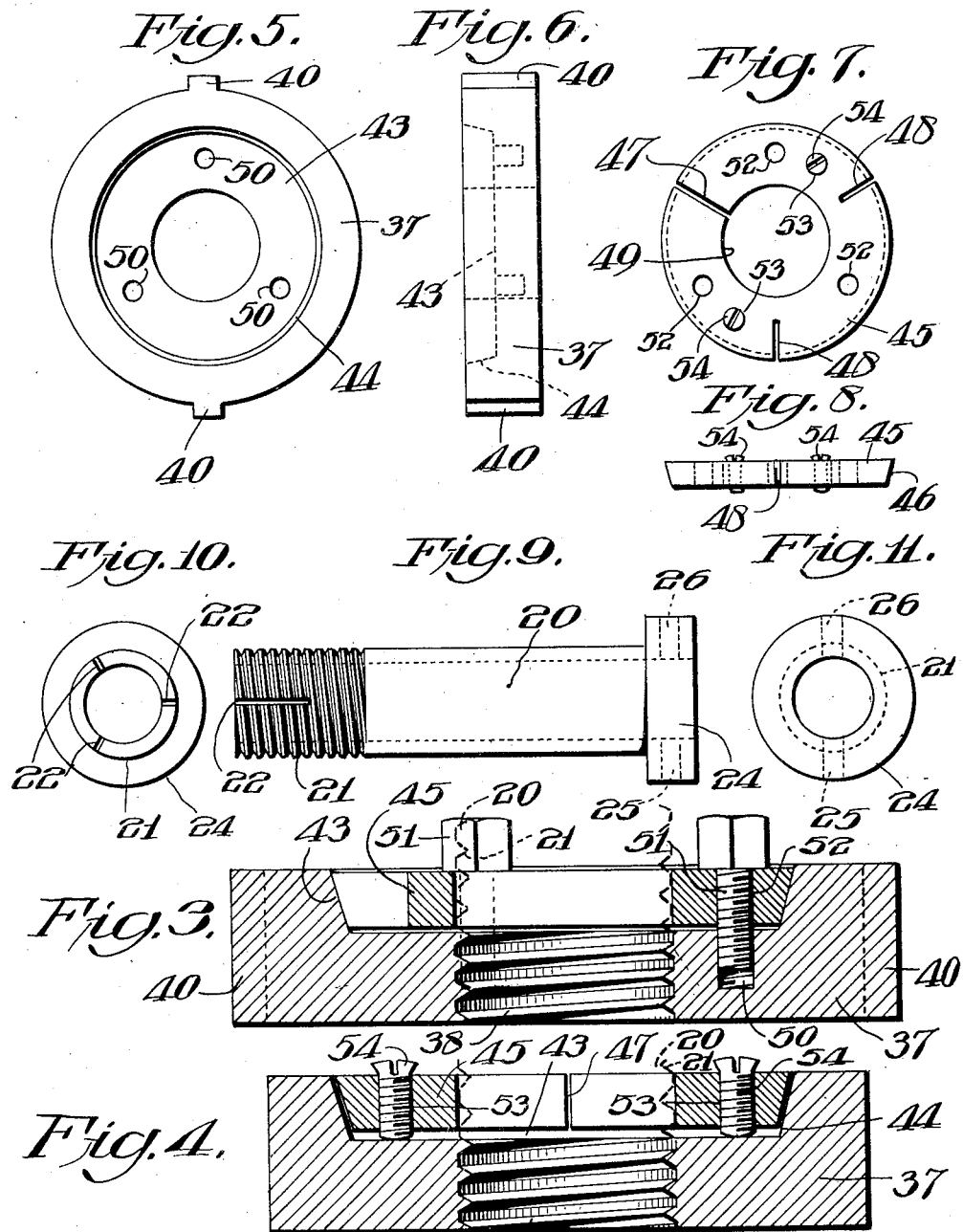

LAWRENCE F. BOYE, OF CHESTER, PENNSYLVANIA.

CLUTCH MECHANISM.

1,348,926.

Specification of Letters Patent.　　Patented Aug. 10, 1920.

Application filed December 19, 1918.　Serial No. 267,424.

*To all whom it may concern:*

Be it known that I, LAWRENCE F. BOYE, a citizen of the United States, residing at Chester, in the county of Delaware and State of Pennsylvania, have invented certain new and useful Improvements in Clutch Mechanism, of which the following is a specification.

One object of my invention is to provide clutch mechanism including a driving member, such as a pulley, which can be easily attached to a shaft without requiring that the shaft be cut or provided with a key to secure the same thereon. The mechanism of my invention can be made to freely slip on any shaft without in any way preparing the shaft with any key slots or other portions for its reception.

Another object is to so construct my invention that it will be readily applicable for attachment to various types of machines, such for example, as the machine forming a part of my pending application for United States patent, Serial No. 259,904, filed October 28th, 1918, in which the machine is adapted to be automatically and abruptly stopped.

A further object is to so construct the mechanism of my present invention that the same can be easily and quickly adjusted to vary the degree of frictional engagement between the driving element, such as the above mentioned pulley, and another part of the clutch mechanism which is operatively connected to the shaft.

A still further object is to make my invention of a simple and durable construction which can be quickly made, assembled and taken apart for cleaning or repair purposes.

These objects, and other advantageous ends which will be described hereinafter, I attain in the following manner, reference being had to the accompanying drawings in which—

Figure 1 is a sectional plan view taken centrally and horizontally through my improved clutch mechanism and also showing certain of the stopping mechanism in section, Fig. 2 is a sectional elevation taken on the line 2—2 of Fig. 1, Fig. 3 is an enlarged fragmentary sectional view taken on the line 3—3 of Fig. 2, certain of the elements being indicated in dot-and-dash lines, Fig. 4 is an enlarged fragmentary section taken on the line 4—4 of Fig. 2 showing certain of the elements in dot-and-dash lines, Fig. 5 is a front elevation of an adjusting ring or disk, Fig. 6 is an edge view of Fig. 5, Fig. 7 is a front elevation of a clamping ring which forms a part of my invention, Fig. 8 is an inverted plan view of Fig. 7, Fig. 9 is a longitudinal elevation of a sleeve which forms a part of my invention, and Figs. 10 and 11 are views of the opposite ends of the sleeve shown in Fig. 9.

In the accompanying drawings, I have shown my invention in connection with sufficient of a machine to illustrate the functions of the mechanism of my invention. However, it will be understood that the mechanism of my invention is applicable to machines of various types.

Referring to the drawings, 18 represents the driving shaft of a machine and 19 represents the frame of said machine. In applying my improved mechanism to the shaft 18, I provide a sleeve 20 on said shaft. The sleeve 20 is externally screw threaded at one end, as shown at 21, and is also split longitudinally of its length, the splits being illustrated at 22 and extending from the end 23 inwardly through the screw threaded portion, as clearly shown in Figs. 9 and 10. The opposite end of the sleeve 20 has a flange 24 provided with a tapped hole 25 extending to the interior of the sleeve and a plain or smooth hole 26. The tapped hole 25 preferably has a set screw 27 therein which can be tightened so as to engage the shaft 18. The sleeve 20 between the threaded portion 21 and the flange 24 provides a bearing for a clutch pulley 28, said clutch pulley having one portion 29 of its hub abutting the inner edge surface of the flange 24 and another hub portion 30 adapted to project through a hole 31 in a clutch member 32, said clutch member having a frusto-conical outer surface 33 adapted to engage a frusto-conical inner surface 34 provided by the clutch pulley 28; it being noted that when the clutch member 32 is moved with sufficient pressure against the surface 34 of the clutch pulley 28, that the pulley 28 and member 32 will rotate together in the manner which is common in various forms of clutches.

The clutch member 32 has a hub 35 which is provided with a cavity 36 through which extends the threaded portion 21 of the sleeve 20. An adjusting ring or disk 37 slidably fits within the cavity 36 and has a screw threaded hole 38 in which fits the screw threaded portion 21 of the sleeve 20. The cavity 36 includes slideways 39 in which fit projecting lugs or keys 40 on the adjusting ring 37. Thus the adjusting ring 37 is permitted to slide axially within the cavity 36 but is prevented from rotating within said cavity. A coiled spring 41 is interposed between the inner surface of the adjusting ring 37 and the innermost surface 42 of the cavity 36; said spring surrounding a part of the hub portion 30.

The adjusting ring 37 has a recess 43, said recess being circular in cross section and having its side surface 44 tapering inwardly. A clamping ring 45 fits within the recess 43 and has an inwardly tapered edge surface 46 adapted to engage the inwardly tapered side surface 44 of the recess 43. The clamping ring 45 is split completely through its thickness and width, as shown at 47, and also has a number of notches 48 which extend inwardly from its peripheral edge surface 46 toward the center of the ring. The clamping ring 45 normally is of greater diameter than the innermost diameter of the recess 43. Thus in order to push the clamping ring 45 within the recess 43, it is necessary that the ring be reduced in diameter. The split 47 and the notches 48 permit this reduction in diameter of the clamping ring for a purpose hereinafter described. The clamping ring 45 has a central smooth hole 49 adapted to encircle the screw threaded portion 21 of the sleeve 20, as clearly shown in Fig. 1.

The adjusting ring 37 has tapped or screw threaded holes 50 extending inwardly from the recess 43 and headed screws 51 are adapted to pass through holes 52 in the clamping ring 45 and enter the screw threaded holes 50 in the adjusting ring 37. The heads of the screws 51 engage the outer surface of the clamping ring 45 and by turning the screws 51 inwardly they will force the clamping ring 45 within the recess 43, and as above described, the clamping ring will be slightly reduced in diameter and clamped upon the screw threaded portion 21 of the sleeve 20. As before stated, this screw threaded portion 21 is provided with the splits 22 and is thus rendered resilient and capable of being compressed into tight engagement with the shaft 18. This provides a positive lock between the sleeve 20 and the shaft 18 and, since the adjusting ring 37 cannot rotate independently of the clutch member 32, the clutch member is thus locked to the shaft 18. It is, therefore, understood that the set screw 27 is not necessary to operatively connect the sleeve 20 with the shaft 18. However, the set screw 27 is of service in assembling the parts when it is desired to hold the sleeve 20 in engagement with said shaft 18.

The clamping ring 45 is also provided with screw threaded holes 53 in which fit screws 54. The function of said screws 54 is to "back out" the clamping ring 45 from the recess 43 when it is desired to change the tension of the clutch members, as will hereinafter be more fully described, it being noted that the inner ends of the screws 54 abut the inner surface of the recess 43, as clearly shown in Fig. 4, and by turning said screws inwardly, the clamping ring 45 will be forced off its seat against the surface 44 of said recess.

The spring 41 normally tends to move the clutch member 32 into frictional engagement with the inner surface 34 of the clutch pulley 28, so that if power is applied to the clutch pulley 28 to rotate it, said pulley will rotate the clutch member 32 due to the frictional engagement between the clutch member and the pulley. It is, therefore, obvious that in order to prevent the rotation of the shaft 18, it is necessary to move the clutch member 32 out of engagement with the clutch pulley 28 and against the tension of said spring 41.

The hub 35 of the clutch member 32 is provided with an annular groove 55 in which fit lugs 56 on a forked clutch disengaging arm or lever 57. The lever 57 is pivoted, within its length, at 58 to a bearing 59 on the frame 19. The end portion 60 of said lever 57 is adapted to engage the head 61 of a screw 62 in a lever 63. The lever 63, within its length, is pivoted at 64 to the bearing 59.

It will be noted that the distance between the pivot 64 and the point of engagement of the screw head 61 with the lever 57 is small compared to the distance between said point of engagement of the screw head 61 and the pivot 58.

The lever 63 has a collar 65 which is attached to a cylindrical casing 66 by a nut 67. This casing has a housing 68 extending at an angle thereto, as clearly shown in Fig. 1. A latch locking bolt 69 is slidably mounted within the casing 66 and has an operating rod 70 screwed therein, said rod passing into the casing and being slidable through a gland nut 71, said gland nut being screwed into one end of the casing 66, as clearly shown in Fig. 1. A latch 72 has a stem 73 which extends at right angles to the length of the locking bolt 69, said stem having a portion 74 of reduced diameter which provides shoulders 75 and 76 between which the end 77 of the bolt 69 is adapted to slide.

A coiled spring 78 is interposed between the inner end of the gland nut 71 and the adjacent end of the latch locking bolt 69. This spring 78 normally tends to move the end 77 of the bolt between the shoulders 75 and 76. The housing 68 incloses a coiled spring 79 which is operative to move the latch stem 73 and the latch 72 outwardly.

The end of the stem 73 opposite the latch 72 is provided with nuts 80 which limit the outward movement of the stem and latch by engaging the end of the housing 68 and, when in this position, the locking bolt 69 is interposed between the shoulders 75 and 76 and the latch cannot be moved inwardly until the rod 70 is pulled to withdraw the bolt 69 from between the shoulders 75 and 76.

A flanged wheel 81 is rotatably connected to any suitable part of a machine, such for example, as to a shaft 82 of the machine and carries a pin 83. It will be understood that the flanged wheel 81 is operatively connected by any suitable means (not illustrated) to the shaft 18 so that when said shaft 18 is rotating, the wheel 81 will be rotating.

In the arrangement of the parts, as illustrated in Fig. 1, it will be understood that the clutch pulley 28 is rotating to effect the operation of the shaft 18 and that the wheel 81 is rotating in the direction of the arrows shown in Figs. 1 and 2.

The latch 72 has an inclined or beveled surface 84 and it will be noted, that as the pin 83 moves into engagement with said surface 84 of the latch 72, that it will cause said latch to be moved out of its path. In view of the fact that the bolt 69 is locked between the shoulders 75 and 76, it is impossible for the latch to move relatively to the bolt 69. However, the lever 63 is pivoted at 64 and the action of the pin 83 against the latch 72 will cause said lever 63 to be rocked, and in so doing, the lever 57 will be rocked to withdraw the clutch member 32 out of engagement with the clutch pulley 28, and thereby stop the rotation of the shaft 18. This stopping action will take place before the pin 83 has freed itself from the latch 72.

To again start the rotation of the shaft 18, it is necessary to pull the rod 70 and thereby withdraw the bolt 69 from between the shoulders 75 and 76. The spring 41 will then tend to move the clutch member 32 into engagement with the clutch pulley 28 and the casing 66 will move toward the wheel 81 in view of the fact that it has been freed by the disengagement of said bolt 69. After the rod 70 has been released, the spring 78 will again operate to lock the latch 72 so that when the pin, which has been freed of the latch 72, again engages the latch, it will serve to act to effect the stopping of the shaft 18 in a manner above described.

A mechanical advantage is attained by the arrangement of the levers 57 and 63 as above described, and with a very slight movement of the lever 63, a great pressure will be exerted upon the spring 41. Therefore, my improved clutch mechanism can be constructed so that it will require a comparatively small motion between the clutch member 32 and the clutch pulley 28 in order to have the parts operate properly.

When it is desired to vary the tension or the friction between the member 32 and pulley 28, the screws 51 are loosened, after which the screws 54 are operated to engage the innermost surface of the recess 43. This will cause the clamping ring 45 to be moved outwardly and the clamping ring will gradually spring to its normal position, and thereby release its hold upon the screw threaded portion 21 of the sleeve 20. The clutch pulley 28, then being in engagement with the member 32, can be turned in either direction to cause the adjusting ring 37 to move to decrease or increase the tension of the spring 41. It will be noted that the said screw 27 serves to secure the sleeve to the shaft during this adjusting action.

My improved clutch mechanism can be easily and quickly assembled and applied to a shaft, and, in so doing, the hole 26 can be used to insert a pin wrench or lever (not illustrated) to facilitate the turning of the sleeve 20 so that its screw threaded portion engages the screw threaded hole 38 in the adjusting ring 37; it being noted that the sleeve 20 must initially be screwed through the adjusting ring 37.

It will be noted that the screw 62 on the lever 63 forms adjusting means which, when turned, changes the relative positions of the levers 57 and 63. By this means a varied movement of the clutch member 32 can be secured relatively to the movement of the lever 63 by the pin 83.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. Clutch mechanism including an externally screw threaded flanged sleeve adapted to freely slide onto a shaft; a clutch member freely rotatable on said sleeve and having a portion in abutment with the flange of said sleeve; a second clutch member for clutching engagement with said first clutch member; means adapted to be screwed on said sleeve and slidably locked to said second clutch member; means rotatable in conjunction with said latter means and adapted to clamp said sleeve to a shaft such as the shaft aforesaid; and a spring interposed between said first means and said second clutch member, whereby when said sleeve and first means are relatively rotated, the spring will be actuated to vary its tension and thereby vary the degree of friction between said clutch members; substantially as described.

2. Clutch mechanism including an externally screw threaded flanged sleeve adapted to freely fit on a shaft; a clutch member freely rotatable on said sleeve and having a portion in abutment with the flange of said sleeve; a second clutch member for engagement with said first clutch member; means adapted to be screwed on said sleeve and slidably connected to said second clutch member; a spring interposed between said means and said second clutch member, whereby when said sleeve and means are relatively rotated, the spring will be actuated to vary its tension and thereby vary the degree of friction between said clutch members; and means carried by said first means for compressing said sleeve into clutching engagement with the shaft; substantially as described.

3. Clutch mechanism of the character described including a driving member; means adapted for engagement with a shaft; a clutch member adapted to engage said driving member; means for compressing said first means to clamp the latter to the shaft; and means for preventing relative rotatable movement between said compressing means and said clutch member, and permitting relative slidable movement between said compressing means and said clutch member; said first means providing a bearing for said driving member; substantially as described.

4. Clutch mechanism including a sleeve adapted to encircle a shaft and having a split screw threaded portion; a driving member; an adjusting ring in screw threaded connection with the screw threads of said sleeve; a clutch member for engaging said driving member and having slidable connection with said adjusting ring but being rotatable in conjunction with said adjusting ring; a clamping ring; said adjusting ring providing means for compressing said clamping ring into engagement with said split portion of the sleeve to clamp the latter against said shaft; means for preventing relative rotatable movement between the adjusting ring and the clamping ring; and a spring for sliding said clutch member relatively to said clamping ring to move said clutch member into engagement with said driving member; substantially as described.

5. Clutch mechanism including a sleeve adapted to encircle a shaft and having a split screw threaded portion; a driving member; an adjusting ring in screw threaded connection with the screw threads of said sleeve; a clutch member for engaging said driving member and having slidable connection with said adjusting ring but being rotatable in conjunction with said adjusting ring; a clamping ring; said adjusting ring providing means for compressing said clamping ring into engagement with said split portion of the sleeve to clamp the latter against said shaft; means for preventing relative rotatable movement between the adjusting ring and the clamping ring; and a spring for sliding said clutch member relatively to said clamping ring to move said clutch member into engagement with said driving member; said sleeve having a flange thereon and forming a bearing for said driving member; substantially as described.

6. Clutch mechanism including a sleeve adapted to encircle a shaft and having a split screw threaded portion; a driving member; an adjusting ring in screw threaded connection with the screw threads of said sleeve; a clutch member for engaging said driving member and having slidable connection with said adjusting ring but being rotatable in conjunction with said adjusting ring; a clamping ring; said adjusting ring providing means for compressing said clamping ring into engagement with said split portion of the sleeve to clamp the latter against said shaft; means for preventing relative rotatable movement between the adjusting ring and the clamping ring; and a spring for sliding said clutch member relatively to said clamping ring to move said clutch member into engagement with said driving member; said sleeve having a flange thereon and forming a bearing for said driving member; said flange forming an abutment for said driving member to prevent sliding movement of the latter in one direction; substantially as described.

7. Clutch mechanism including a sleeve adapted to encircle a shaft and having a split screw threaded portion; a driving member; a clutch member for engagement with said driving member and having a cavity; an adjusting ring slidably mounted within said cavity and locked against rotatable movement relatively to said clutch member; said adjusting ring having a tapered recess and being in screw threaded connection with said threaded portion of the sleeve; a split clamping ring adapted to fit within said recess and having a diameter normally greater than the smallest diameter of said recess; means for forcing said clamping ring into said recess whereby the clamping ring is reduced in diameter to clamp said split portion of the sleeve and thereby secure it to said shaft; said clamping ring, when forced within said recess, being locked against rotation relatively to said adjusting ring; and a spring fitting within said cavity and operative to slide said clutch member relatively to said adjusting ring and thereby cause said clutch member to engage the driving member; substantially as described.

8. Clutch mechanism including a sleeve adapted to encircle a shaft and having a screw threaded portion; a driving member; a clutch member for engagement with said driving member and having a cavity; an adjusting ring slidably mounted within said cavity and locked against rotatable movement relatively to said clutch member; said adjusting ring having a tapered recess and being in screw threaded connection with said threaded portion of the sleeve; a split clamping ring adapted to fit within said recess and having a diameter normally greater than the smallest diameter of said recess; said adjusting ring having screw threaded holes therein; headed screws passing through said clamping ring and fitting said screw threaded holes; said screws being adapted, when turned, to force the clamping ring within said recess to compress said clamping ring against said sleeve and consequently to clamp the sleeve to said shaft; and a spring mounted within said cavity and operative to cause slidable movement between said adjusting ring and the clutch member to cause the latter to move into engagement with the driving member; substantially as described.

9. Clutch mechanism including a sleeve adapted to encircle a shaft and having a split screw threaded portion; a driving member; a clutch member for engagement with said driving member and having a cavity; an adjusting ring slidably mounted within said cavity and locked against rotatable movement relatively to said clutch member; said adjusting ring having a tapered recess and being in screw threaded connection with said threaded portion of the sleeve; a split clamping ring adapted to fit within said recess and having a diameter normally greater than the smallest diameter of said recess; means for forcing said clamping ring into said recess whereby the clamping ring is reduced in diameter to clamp said split portion of the sleeve and thereby secure it to said shaft; said clamping ring, when forced within said recess, being locked against rotation relatively to said adjusting ring; and means operative to slide said clutch member relatively to said adjusting ring and thereby cause said clutch member to engage the driving member; substantially as described.

10. Clutch mechanism including a sleeve adapted to encircle a shaft and having a screw threaded portion; a driving member; a clutch member for engagement with said driving member and having a cavity; an adjusting ring slidably mounted within said cavity and locked against rotatable movement relatively to said clutch member; said adjusting ring having a tapered recess and being in screw threaded connection with said threaded portion of the sleeve; a split clamping ring adapted to fit within said recess and having a diameter normally greater than the smallest diameter of said recess; said adjusting ring having screw threaded holes therein; headed screws passing through said clutch ring and fitting said screw threaded holes; said screws being adapted, when turned, to force the clamping ring within said recess to compress said clamping ring against said sleeve and consequently to clamp the sleeve to said shaft; and means operative to cause slidable movement between said adjusting ring and the clutch member to cause the latter to move into engagement with the driving member; substantially as described.

11. Clutch mechanism including a sleeve adapted to freely slide onto a shaft; a rotatable clutch member; means rotatable in conjunction with said clutch member and having a tapered cavity; clamping means; means for moving said clamping means into said tapered cavity, whereby said clamping means is moved into engagement with said sleeve to compress the sleeve into clamping engagement with a shaft such as the shaft aforesaid; and a second clutch member for engagement with said first clutch member; substantially as described.

12. Clutch mechanism including a sleeve adapted to freely slide onto a shaft; a rotatable clutch member; means slidably connected to said clutch member and having a tapered cavity; clamping means; means for moving said clamping means into said tapered cavity, whereby said clamping means is moved into engagement with said sleeve to compress the sleeve into clamping engagement with a shaft such as the shaft aforesaid; a second clutch member; and means for sliding said first clutch member into engagement with said second clutch member, said sliding action of the first clutch member being permitted, due to the sliding connection between said first means and the first mentioned clutch member; substantially as described.

In testimony whereof I have signed my name to this specification in the presence of two subscribing witnesses.

LAWRENCE F. BOYE.

Witnesses:
AUGUSTUS B. COPPES,
CHAS. E. POTTS.